US008943147B2

(12) United States Patent
Baartman et al.

(10) Patent No.: US 8,943,147 B2
(45) Date of Patent: Jan. 27, 2015

(54) SENDING A CHAT CONTEXT TO A RECIPIENT (75) Inventors: Randall P. Baartman, Pine Island, MN (US); James E. Carey, Rochester, MN (US); Jenny S. Li, Danbury, CT (US); John S. Mysak, Rochester, MN (US); Amy D. Travis, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 419 days.

(21) Appl. No.: 12/969,198

(22) Filed: Dec. 15, 2010

(65) Prior Publication Data
US 2012/0158853 A1 Jun. 21, 2012

(51) Int. Cl.
G06F 15/16 (2006.01)
H04L 12/58 (2006.01)
H04L 12/18 (2006.01)

(52) U.S. Cl.
CPC .......... *H04L 12/581* (2013.01); *H04L 12/1822* (2013.01); *H04L 12/1827* (2013.01)
USPC ............... 709/206; 725/47; 725/109; 714/12; 709/231; 709/226; 709/224; 709/205

(58) Field of Classification Search
CPC ....... H04L 51/05; H04L 12/581; H04L 51/04; G06F 12/0831
USPC .......... 711/154, 147, 141; 709/217, 207, 206, 709/204, 238, 225, 224, 201, 203, 219, 223, 709/218; 370/330
See application file for complete search history.

(56) References Cited

U.S. PATENT DOCUMENTS

| | | | |
|---|---|---|---|
| 7,043,472 B2 | 5/2006 | Aridor et al. | |
| 7,668,922 B2 | 2/2010 | Garbow et al. | |
| 2002/0049786 A1* | 4/2002 | Bibliowicz et al. | 707/511 |
| 2007/0011155 A1 | 1/2007 | Sarkar | |
| 2007/0124312 A1* | 5/2007 | Simpson et al. | 707/10 |
| 2007/0271340 A1* | 11/2007 | Goodman et al. | 709/206 |
| 2008/0109406 A1* | 5/2008 | Krishnasamy et al. | 707/3 |
| 2009/0172111 A1* | 7/2009 | Jones et al. | 709/206 |
| 2009/0248809 A1 | 10/2009 | Yedavilli et al. | |
| 2011/0093455 A1* | 4/2011 | Benyamin et al. | 707/723 |

OTHER PUBLICATIONS

Method of Managing Open Chat Conversations With Context, http://priorartdatabase.com/IPCOM/000199378.com, Aug. 31, 2010, pp. 1-3, ip.com.

* cited by examiner

*Primary Examiner* — David Lazaro
*Assistant Examiner* — Charles Murphy
(74) *Attorney, Agent, or Firm* — Owen J. Gamon; Matthew C. Zehrer (57) ABSTRACT In an embodiment, a plurality of respective context keywords are stored to a plurality of contexts, wherein each of the plurality of respective context keywords is different. In response to sending of a first plurality of instant messages from an electronic device, a first context is selected at the electronic device from among the plurality of contexts. A first context keyword of the plurality of respective context keywords that matches respective first terms in the first plurality of instant messages is stored in the first context. The first plurality of instant messages are stored to a first chat session in the first context that was selected by the selecting. The first context that comprises the first plurality of instant messages and the first context keyword is sent to a recipient device.

15 Claims, 6 Drawing Sheets

SENDING A CHAT CONTEXT TO A RECIPIENT

FIELD

An embodiment of the invention generally relates to computer systems in a network that communicate via instant messaging chat sessions.

BACKGROUND

Computer systems typically comprise a combination of computer programs and hardware, such as semiconductors, transistors, chips, circuit boards, storage devices, and processors. The computer programs are stored in the storage devices and are executed by the processors.

Computers and other electronic devices are often connected in networks. One such network is the Internet, in which electronic document transfer and message communication such as forums (pages that contain posts submitted by users known as posters), electronic mail (email), and instant messaging are commonplace.

Instant messaging, also known as chat or chat sessions, allows a user at an electronic device to send a message over a network to another user that is concurrently connected to the network. With instant messaging, a user has a contact list that includes the names or identifications of other users with whom communication may be desired in the future. When users identified in the contacts list connect to the network, the user is notified of their presence, so that an interactive chat session may begin if desired. During the interactive chat session, the instant messages between users are immediately (or nearly immediately) routed to the users' electronic devices and displayed on a pop-up window or display area of a display screen. In this way, two or more users may converse with one another in a simulated real-time manner through messages.

Instant messaging differs from other forms of electronic communication, such as email and forum posts in several important ways. First, instant messaging requires that the sender and receiver are concurrently connected to the network, but email and forum posts have no such requirement. Second, email and forum posts require the existence of separate servers (an email server and a page server, respectively), which are computer systems that store the electronic communication for later retrieval. Third, email and forum posts require the receiver to connect to the separate server and retrieve the email or pages of posts, which a receiver either performs periodically (e.g. on a scheduled basis, such as every few minutes), or only in response to an explicit user request, such as a request to retrieve email or download a page of posts. In contrast, an instant messaging client at the receiver need only monitor a port at the receiver for incoming instant messages, so instant messages are received faster and with less receiver processing power than required for email and forum posts.

Some forums provide a service to their registered users that the forum documentation might call an "inbox," a "private message," or an "instant message," but which is actually a forum post that may be retrieved only by a specified intended user or users, as opposed to public forum posts that may be retrieved by all users or all registered users. Forum posts are not true instant messages because the poster may post them to the forum server regardless of whether the specified intended user(s) are online or connected to the forum server, the posts are stored at the forum server and may only be retrieved by the intended user(s) via a time-consuming explicit request to the forum server for a page, and the poster may delete the forum post subsequent to posting it.

The unique features of instant messages (as opposed to email and forum posts, whether public or non-public) provide users with the ability to engage in a near real-time conversation, which is appealing to users.

SUMMARY

A method, computer-readable storage medium, and computer system are provided. In an embodiment, a plurality of respective context keywords are stored to a plurality of contexts, wherein each of the plurality of respective context keywords is different. In response to sending of a first plurality of instant messages from an electronic device, a first context is selected at the electronic device from among the plurality of contexts. A first context keyword of the plurality of respective context keywords that matches respective first terms in the first plurality of instant messages is stored in the first context. The first plurality of instant messages are stored to a first chat session in the first context that was selected by the selecting. The first context that comprises the first plurality of instant messages and the first context keyword is sent to a recipient device.

BRIEF DESCRIPTION OF THE SEVERAL VIEWS OF THE DRAWINGS

It is to be noted, however, that the appended drawings illustrate only example embodiments of the invention, and are therefore not considered a limitation of the scope of other embodiments of the invention.

DETAILED DESCRIPTION

Figure 1:
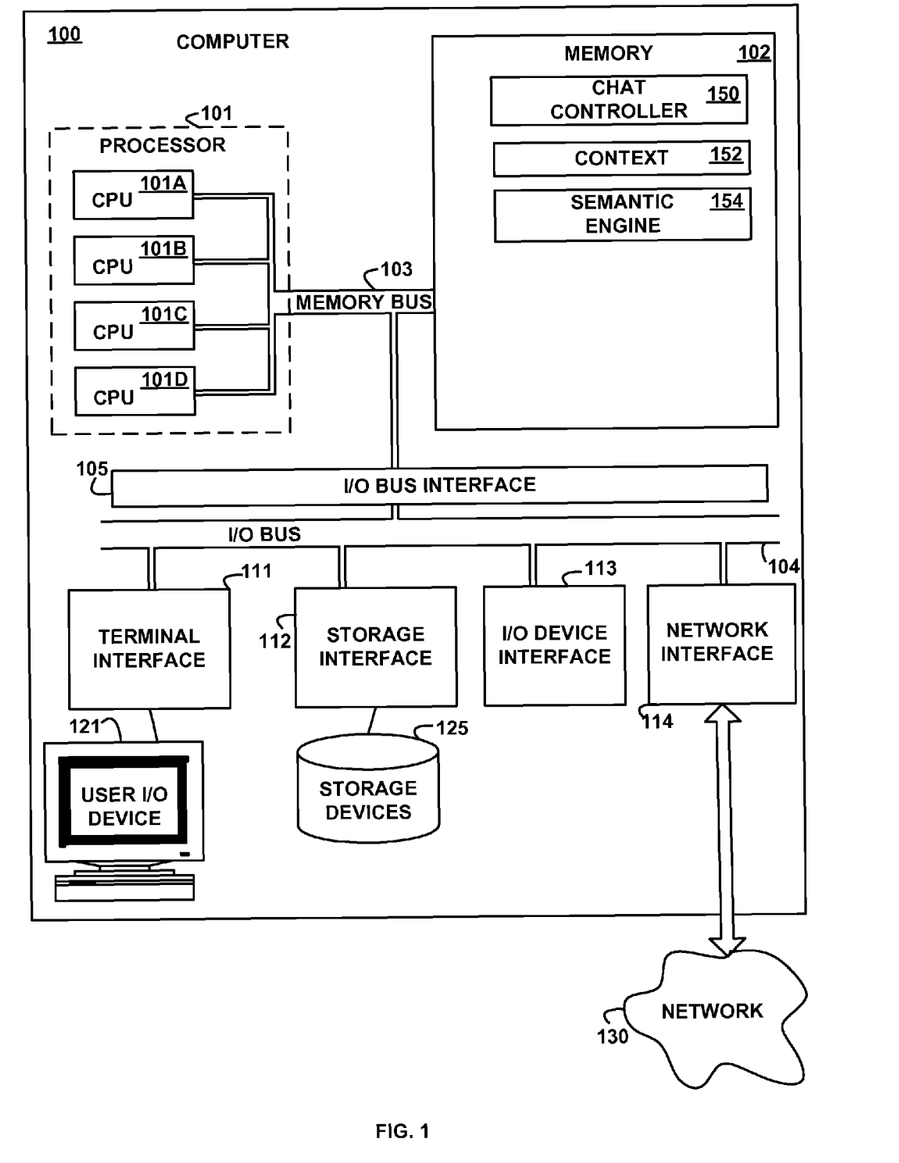
FIG. 1 depicts a high-level block diagram of an example system for implementing an embodiment of the invention.

Referring to the Drawings, wherein like numbers denote like parts throughout the several views, FIG. 1 depicts a high-level block diagram representation of a computer system 100 connected to a network 130, according to an embodiment of the present invention. The major components of the computer system 100 comprise one or more processors 101, a main memory 102, a terminal interface 111, a storage interface 112, an I/O (Input/Output) device interface 113, and a network adapter 114, all of which are communicatively coupled, directly or indirectly, for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may comprise one or more levels of on-board cache.

In an embodiment, the main memory 102 may comprise a random-access semiconductor memory, storage device, or storage medium for storing or encoding data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 102 stores or encodes a chat controller 150, a context 152, and a semantic engine 154. Although the chat controller 150, the context 152, and the semantic engine 154 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the chat controller 150, the context 152, and the semantic engine 154 are illustrated as being contained within the main memory 102, these elements are not necessarily all completely contained in the same storage device at the same time. Further, although the chat controller 150, the context 152, and the semantic engine 154 are illustrated as being separate entities, in other embodiments some of them, portions of some of them, or all of them may be packaged together.

In an embodiment, the chat controller 150 and/or the semantic engine 154 comprise instructions or statements that execute on the processor 101 or instructions or statements that are interpreted by instructions or statements that execute on the processor 101, to carry out the functions as further described below with reference to FIGS. 2, 3, 4, 5, and 6. In another embodiment, the chat controller 150 and/or the semantic engine 154 are implemented in hardware via semiconductor devices, chips, logical gates, circuits, circuit cards, and/or other physical hardware devices in lieu of, or in addition to, a processor-based system. In an embodiment, the chat controller 150 and/or the semantic engine 154 comprise data in addition to instructions or statements. In various embodiments, the chat controller 150 and/or the semantic engine 154 are user applications, third-party applications, operating systems, or any portion, multiple, or combination thereof.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104.

The I/O interface units support communication with a variety of storage and I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the computer system 100, and may receive output data via the user output devices. For example, a user interface may be presented via the user I/O device 121, such as displayed on a display device, played via a speaker, or printed via a printer.

The storage interface unit 112 supports the attachment of one or more disk drives or direct access storage devices 125 (which are typically rotating magnetic disk drive storage devices, although they could alternatively be other storage devices, including arrays of disk drives configured to appear as a single large storage device to a host computer). In another embodiment, the storage device 125 may be implemented via any type of secondary storage device. The contents of the main memory 102, or any portion thereof, may be stored to and retrieved from the storage device 125, as needed. The I/O device interface 113 provides an interface to any of various other input/output devices or devices of other types, such as printers or fax machines. The network adapter 114 provides one or more communications paths from the computer system 100 to other digital devices and computer systems; such paths may comprise, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

FIG. 1 is intended to depict the representative major components of the computer system 100 and the network 130. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

The computer programs comprise one or more instructions or statements that are resident at various times in various memory and storage devices in the computer system 100 and that, when read and executed by one or more processors in the computer system 100 or when interpreted by instructions that are executed by one or more processors, cause the computer system 100 to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk (e.g., the storage device 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, nonprofit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

Figure 2:
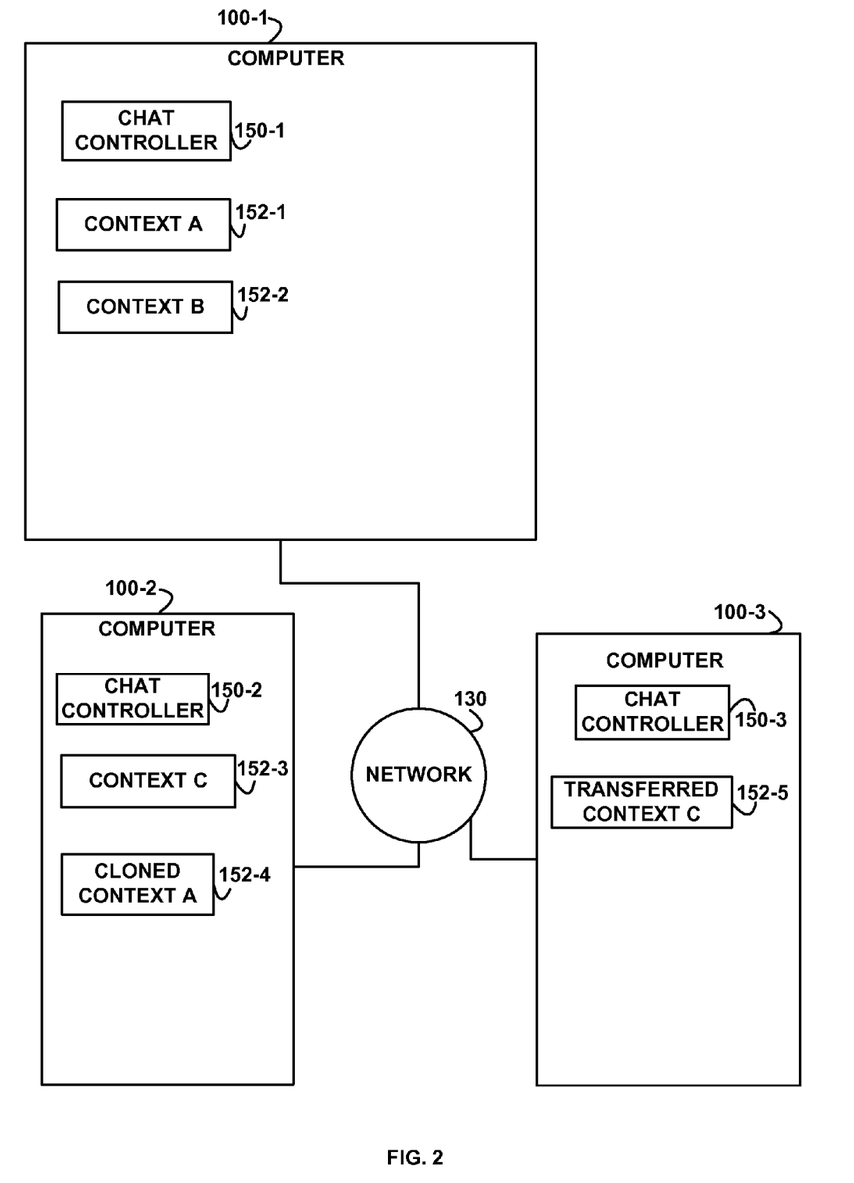
FIG. 2 depicts a high-level block diagram of an example network of systems for implementing an embodiment of the invention.

FIG. 2 depicts a high-level block diagram of an example network 130 connected to computer systems 100-1, 100-2, and 100-3, for implementing an embodiment of the invention. The computer 100-1 comprises a chat controller 150-1, a context A 152-1 and a context B 152-2. The computer 100-2 comprises a chat controller 150-2, a context C 152-3, and a cloned context A 152-4. The computer 100-3 comprises a chat controller 150-3 and a transferred context C 152-5. The example computer systems 100-1, 100-2, and 100-3 are examples of, and are generically referred to by, the computer system 100 (FIG. 1). The chat controllers 150-1, 150-2, and 150-3 are examples of, and are generically referred to by, the chat controller 150 (FIG. 1). The context A 152-1, the context B 152-2, the context C 152-3, the cloned context A 152-4, and the transferred context C 152-5 are examples of, and are generically referred to by, the context 152 (FIG. 1). The context A 152-1 and the context B 152-2 comprise instant messages that were sent and/or received by a user at the computer 100-1. The context C 152-3 comprises instant messages that were sent and/or received by a user at the computer 100-2.

The cloned context A 152-4 is a clone or copy of the context A 152-1 and comprises instant messages that were not necessarily sent or received by a user at the computer 100-2 prior to receiving the cloned context A 152-4. The computer 100-1 is a sender or originator of the cloned context A 152-4, and the computer 100-2 is a destination or recipient of the cloned context A 152-4. The transferred context C 152-5 is a copy of the context C 152-3, including a transfer of ownership of the context C 152-3 and comprises instant messages that were not necessarily sent or received by a user at the computer 100-3 prior to receiving the transferred context C 152-5. The computer 100-2 is the originator or transferor of the transferred context C 152-5, and the computer 100-3 is the recipient or transferee of the transferred context C 152-5.

Figure 3:
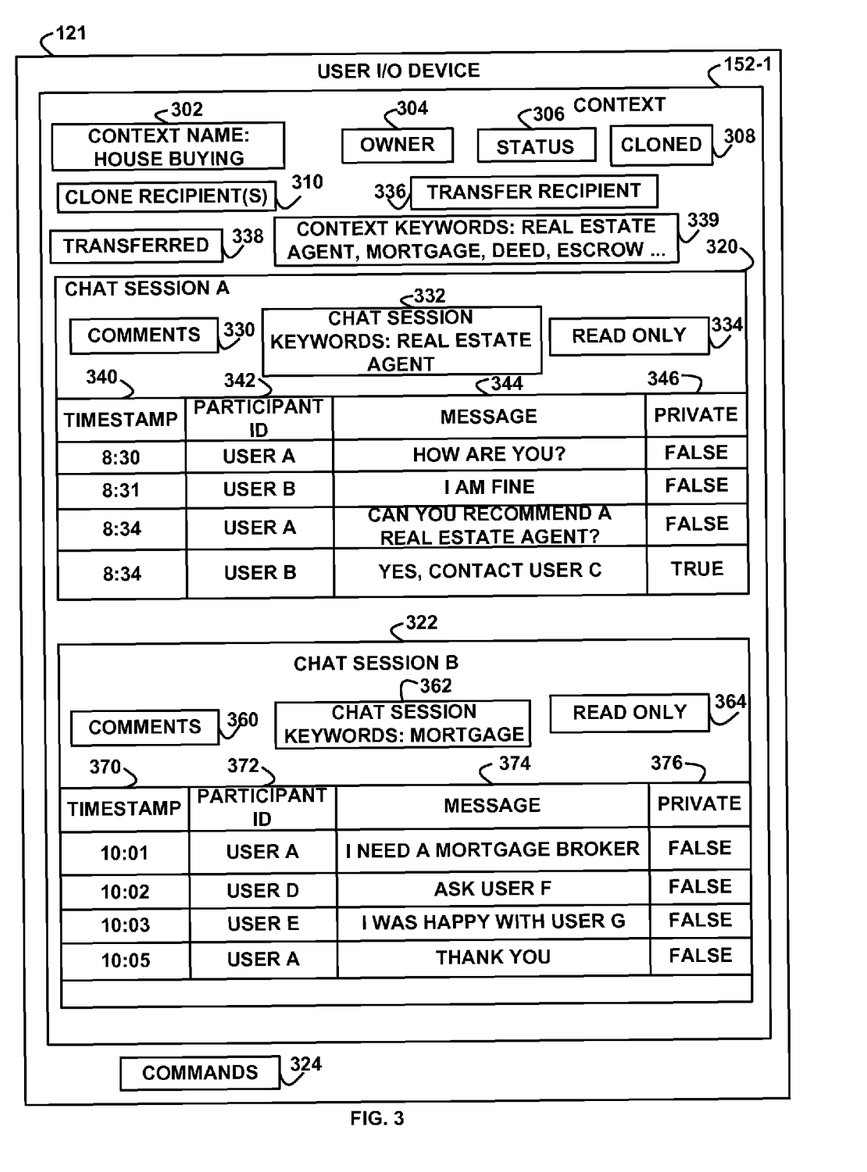
FIG. 3 depicts a block diagram of an example context displayed on a user I/O (Input/Output) device, according to an embodiment of the invention.

FIG. 3 depicts a block diagram of an example context 152-1 and commands 324 displayed via a user I/O device 121, according to an embodiment of the invention. The context 152-2 is an example of, and is generically referred to by, the context 152 (FIG. 1). The contexts 152-2, 152-3, 152-4, and 152-5 (FIG. 2) may have identical, some of the same, or complete different data as the example context 152-1. The context 152-1 comprises a context name 302, an owner 304, a status 306, a cloned field 308, a clone recipient(s) field 310, a transfer recipient field 336, a transferred field 338, and context keywords 339.

The context name 302 identifies the context 152-1 and comprises terms that describe the context 152-1. The owner 304 identifies the user, computer 100-1, or any combination thereof that owns or controls the context 152-1 and has the power to transfer ownership of the context 152-1 while non-owners of the context 152-1 do not have the power to transfer ownership of the context 152-1. The status 306 may indicate that the context 152-1 is open or closed. If the status 306 indicates that the context 152-1 is open, then the chat controller 150 allows instant messages to be added to the chat sessions 320 and 322 in the context 152-1. If the status 306 indicates that the context 152-1 is closed, then the chat controller does not allow instant messages to be added to chat sessions 320 and 322 in the context 152-1. After transferring a context 152-1 from a transferor device to a transferee device, the chat controller 150 at the transferor device changes the status 306 of the context 152-1 from open (if open) to closed at the transferor device. The status of the context 152-1 at the transferee device remains open (if open) or closed (if closed). The cloning of a context 152-1 from an a originating device of a cloned context to a destination device of a cloned context does not change the status of the context 152-1 at either the originating device or the destination device. The cloned field 308 specifies whether or not the context 152-1 is cloned to the clone recipients 310. The clone recipient(s) field 310 identifies the users and/or computers that are receiving cloned updates to the context 152-1. The transferred field 338 indicates whether or not the ownership of the context 152-1 has been transferred to a new owner device and/or user identified by the transfer recipient field 336. The transfer recipient field 336 identifies the recipient user and/or computer or electronic device that is the new owner to whom ownership of the context 152-1 was transferred.

The context keywords 339 comprise terms or words that are not present in the context name 302, but that are semantically related to or derived from the meaning of the context name 302. For example, if the context name 302 comprises "house buying," then the context keywords 339 may comprise "earnest money," "purchase agreement," "escrow," "mortgage," "real estate agent," and/or "deed," or any other appropriate keywords, because the keywords are present in descriptions of actions that are part of carrying out the process of buying a house.

The context 152-1 further comprises a chat session 320 and a chat session 322, but in other embodiments any number of chat sessions may be present. The chat session 320 comprises comments 330, chat session keywords 332, a read only field 334, and any number of records, each comprising a timestamp field 340, a participant identifier field 342, an instant message field 344, and a private field 346.

The comments 330 comprise text, video, or audio that the chat controller 150 receives from the user I/O device 121 and stores to the comments 330. The comments 330 describe, characterize, or annotate the chat session 320. In an embodiment, the comments 330 or portions of the comments 330 may be marked or indicated as private (meaning they may not be cloned) or non-private (meaning they may be cloned).

The chat session keywords 332 comprise terms or words that are not present in the context name 302, but that are semantically related to or derived from the meaning of the context name 302. For example, if the context name 302 comprises "house buying," then the chat session keywords 332 may comprise "earnest money," "purchase agreement," "escrow," "mortgage," "real estate agent," and/or "deed" because the keywords are present in descriptions of actions that are part of carrying out the process of buying a house. In an embodiment, selection of one of the chat session keywords 332 causes the chat controller 150 to highlight or visually emphasize the terms in the displayed chat session 320 that match the selected chat session keyword 332. The read only field 334 indicates whether the user at the computer 100 is allowed to modify the chat session 320 or whether the user is a spectator, in which case the chat session 320 is read only.

The timestamp field 340 specifies the date and/or time at which the instant message 344 in the same record was sent to the participant 342. The participant identifier field 342 indicates the user and/or computer that was the destination of the instant message 344. In various embodiments, the participant identifier may specify a user name, domain name, and/or network address of the destination of the instant message 344 in the same record. In an embodiment, the participant identifier 342 may specify both the sender and the destination of the instant message 344 in the same record. The instant message field 344 comprises the text, video, audio, or other data that was sent to the participant 342. The private field 346 indicates whether or not the instant message 344 in the same record is private. In an embodiment, the default setting for the private field 346 is that the instant message in the same record is not private. An instant message 344 that is non-private may be cloned. An instant message that is private may not be cloned. As illustrated in the chat session 320, some of the instant messages may be private while other instant messages are non-private.

The chat controller 150 added the instant messages 344 in the records to the chat session 320, in response to sending the instant messages from a sending device to a destination device, or in response to receiving the instant messages at a destination device from a sending device, because the instant messages 344 comprise terms that match one or more of the context keywords 339. The chat controller 150 searched the instant messages in the chat session 320 for terms that match the context keywords 339 and added the found matching terms to the chat session keywords 332. Thus, the chat session keywords 332 specify a subset of the context keywords 339 that match terms in the messages in the chat session 320.

The chat session 322 comprises comments 360, chat session keywords 362, a read only field 364, and any number of records, each comprising a timestamp field 370, a participant identifier field 372, an instant message field 374, and a private field 376. The comments 360 comprise text, video, or audio that the chat controller 150 receives from the user I/O device 121 and stores to the comments 360. The comments 360 describe, characterize, or annotate the chat session 322. In an embodiment, the comments 360 or portions of the comment 360 may be marked or indicated as private (meaning they may not be cloned) or non-private (meaning they may be cloned).

The chat session keywords 362 comprise words that are not present in the context name 302, but that are semantically related to or derived from the meaning of the context name 302. The chat session keywords 362 may be the same or different from the chat session keywords 332. The read only field 364 indicates whether the user at the computer 100 is allowed to modify the chat session 322 or whether the user is a spectator, in which case the chat session 322 is read only. The value of the read only field 364 may be the same or different than the value of the read only field 334.

The timestamp field 370 specifies the date and/or time at which the instant message 374 in the same record was sent to the participant 372. The participant identifier field 372 indicates the user and/or computer that was the destination of the instant message 374. In various embodiments, the participant identifier 372 may specify a user name, domain name, and/or network address of the destination of the instant message 374 in the same record. The instant message field 374 comprises the text, video, audio, or other data that was sent to the participant 372. In an embodiment, the participant identifier 372 may specify both the sender and the destination of the instant message 374 in the same record. The private field 376 indicates whether or not the instant message 374 in the same record is private. In an embodiment, the default setting for the private field 376 is that the instant message in the same record is not private. An instant message 374 that is non-private may be cloned. An instant message that is private may not be cloned. As illustrated in the chat session 322, some of the instant messages may be private while other instant messages are non-private.

The chat controller 150 added the instant messages 374 in the records to the chat session 322, in response to sending the instant messages from a sending device to a destination device, or in response to receiving the instant messages at a destination device from a sending device, because the instant messages 374 comprise terms that match one or more of the context keywords 339. The chat controller 150 searched the instant messages in the chat session 322 for terms that match the context keywords 339 and added the found matching terms to the chat session keywords 362. Thus, the chat session keywords 362 specify a subset of the context keywords 339 that match terms in the messages in the chat session 322. The chat session keywords 362 may be the same or different from the chat session keywords 332.

The commands 324 comprise command or requests and data or parameters sent from the user I/O device 121 via a user interface to the chat controller 150. In various embodiments, the commands 324 are implemented as buttons, menus, options, widgets, dials, input fields, a speech-to-text function, or any other appropriate user input techniques. In various embodiments, the commands 324 comprise a create context command, a modify context command, a transfer context command, a clone context command, a stop cloning command, a send chat instant message command, and a promote spectator command, which are received and processed by the chat controller 150 as further described below with reference to FIGS. 4, 5, and 6.

In an embodiment, the chat controller 150 adds, to a context 152-1, the instant messages that comprise terms that match (are identical to) at least one of the context keywords 339 in the context 152-1 and does not add, to the context 152-1, the instant messages that do not comprise terms that match the context keywords 339. For example, if the context keyword 339 contains "real estate agent, mortgage deed, escrow" the chat controller adds to the context 152-1 the instant message "Can you recommend a real estate agent," but does not add the instant message of "Can you recommend a grocery store?" because "Can you recommend a grocery store" does not include any of the context keywords 339 of "real estate agent, mortgage deed, escrow."

In an embodiment, the chat controller 150 adds an instant message, to a context 152-1, that comprises terms that match at least one of the context keywords 339 and also adds a set of instant messages to the context 152-1 that are sent in the same chat session as the instant message with the matching terms, are sent by the same sender device or user as the instant message with the matching terms, are received by the same destination device or user as the instant message with the matching terms, or are sent by any sender device or user and/or received by any destination device and/or user within a threshold amount of time (either before or after) the instant message with the matching terms, even if the set of instant messages does not comprise terms that match the context keywords 339. For example, if the context keywords 339 comprise "real estate agent, mortgage, deed, escrow," the chat controller adds an instant message "Can you recommend a real estate agent?" to the context 152-1 because it comprises "real estate agent," which matches a context keyword 339. The chat controller 150 also adds the set of instant messages of "How are you," "I am fine," and "Yes, contact user C" to the same context 152-1 as the instant message with the matching terms if the set is sent or received within a time threshold (either before or after) of the instant message with the matching terms, even though the set does not comprise any of the context keywords 339.

In an embodiment, the chat controller 150 adds an instant message, to a context 152-1, that comprise terms that match the context keywords 339 and also adds a set of instant messages to the context 152-1 that are sent in the same chat session as the first instant message, are sent by the same sender as the first instant message, are received by the same destination as the first instant message, or are sent by any sender and/or received by any destination within a threshold amount of time after the instant message that contains the matching terms, even if the set of instant messages does not comprise terms that match the context keywords 339. But, the chat controller 150 does not add instant messages, to the context 152-1, that are sent or received before the instant message with the matching terms. For example, if the context keywords 339 contain "real estate agent, mortgage, deed, escrow," then the chat controller 150 adds the instant message "I need a mortgage broker" to the context 152-1 because it contains the term "mortgage," which matches a context keyword 339. The chat controller 150 also adds the set of instant response messages of "Ask user F", "I was happy with user G," and Thank you," which are sent after the instant message with the matching term of "mortgage," but does not add an instant message of "We should have lunch, sometime," if it was sent or received before the instant message of "I need a mortgage broker."

In various embodiments, the chat controller 150 selects the chat session 320 or 322 into which to add an instant message based on a match between a chat session identifier in the chat session and a chat session identifier in the instant message, based on the chat session that is open and actively sending and receiving messages, based on a selection of a chat session by the user via the user I/O device 121, based on a match between the participant identifiers 342 or 372 and the sender and/or receiver of the instant message, or based on a term in the instant message that matches one of the chat session keywords 332 and 362 but not the chat session keywords of other chat sessions.

Figure 4:
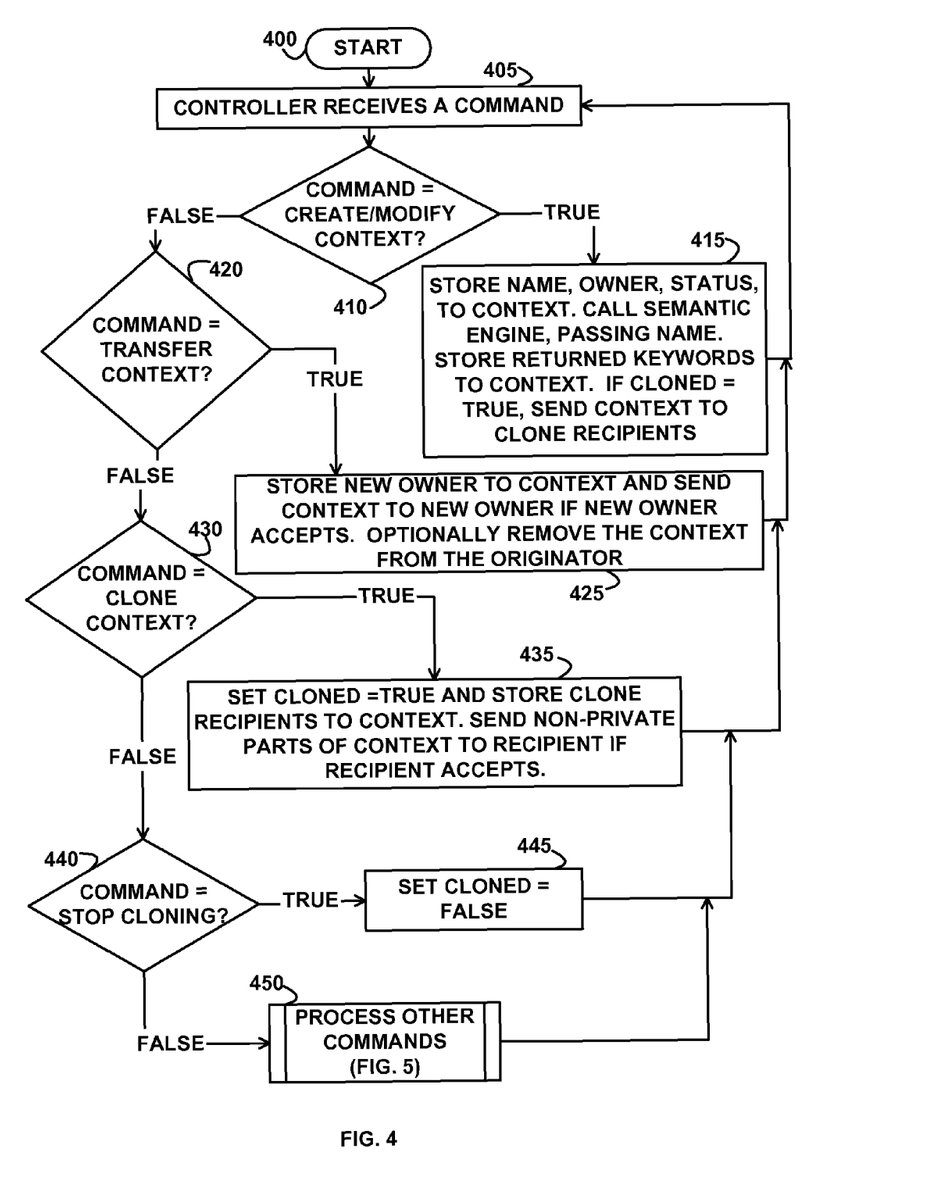
FIG. 4 depicts a flowchart for processing chat commands, according to an embodiment of the invention.

FIG. 4 depicts a flowchart for processing chat commands, according to an embodiment of the invention. Control begins at block 400. Control then continues to block 405 where the chat controller 150 receives a chat command from the user I/O device 121 or from another computer, such as a computer connected via the network 130. Control then continues to block 410 where the chat controller 150 determines whether the received command is a create or modify context command.

If the determination at block 410 is true, then the received command is a create or modify context command received from the user I/O device 121, which specifies a context name, an owner of a context, a status of a context 152, or any combination thereof, so control continues to block 415 where the chat controller 150 creates the specified context 152 if the context 152 does not already exist and stores the specified name, owner, and/or status, to the specified context 152. The chat controller 150 calls the semantic engine 154 and passes the name of the context 152 to the semantic engine 154. The semantic engine 154 reads the name 302 of the context 152, performs semantic analysis on the name 302, determines the meaning of the terms of the name 302, and returns keywords related to or derived from the meaning of the name to the chat controller 150. An example of a semantic engine 154 that performs such semantic analysis is the Unstructured Information Management Architecture (UIMA) framework available from INTERNATIONAL BUSINESS MACHINES CORPORATION. In another embodiment, a user inputs the context keywords via the user I/O device 121. The chat controller 150 stores the returned keywords to the context keywords 339 in the context 152. If the cloned field 308 indicates that the context 152 is cloned, then the chat controller 150 sends the context 152 to the clone recipients 310. If the cloned field 308 indicates that the context 152 is not cloned, then the chat controller 150 does not send the context 152 to the clone recipients 310. Control then returns to block 405 where the chat controller 150 receives the same or a different command from the user I/O device 121 or the network 130, as previously described above. The controller 150 may receive a create and/or modify context for each context, and the contexts at a computer have different names and different context keywords derived from the different names.

If the determination at block 410 is false, then the received command is not a create or modify context command, so control continues to block 420 where the chat controller 150 determines whether the received command is a transfer context command received from the user I/O device 121. If the determination at block 420 is true, then the received command is a transfer context command that specifies an identifier of a new owner of the context 152, so control continues to block 425 where the chat controller 150 stores the identifier of the new owner to the specified context 152 and sends the specified context 152 to the new owner at a recipient device if the new owner at the recipient device accepts the transfer of ownership. If the new owner does not accept transfer of ownership, then the chat controller 150 does not send the specified context 152 to the new owner.

The chat controller 150 optionally deletes the transferred context 152 from the originator or previous owner of the transferred context 152 or sets the transferred field 338 to indicate that the context 152 has been transferred. In an embodiment, the chat controller 150 sends the non-private portions of the chat session to the new owner and does not send the portions marked as private. In another embodiment, the chat controller 150 sends both the private and the non-private portions of the chat session to the new owner. Control then returns to block 405 where the chat controller 150 receives the same or a different command from the user I/O device 121 or the network 130, as previously described above.

If the determination at block 420 is false, then the received command is not a transfer context command, so control continues to block 430 where the chat controller 150 determines whether the received command is a clone context command received from the user I/O device 121. If the determination at block 430 is true, then the received command is a clone context command received from the user I/O device 121 that specifies clone recipient(s) of the context 152, so control continues to block 435 where the chat controller 150 sets the cloned field 308 in the context 152 to indicate that the context 152 is cloned and stores identifiers of the clone recipients to the clone recipient(s) field 310 in the context 152. The chat controller 150 sends the non-private portions of the context 152 to the clone recipient(s) 310 if the clone recipient(s) 310 accept the cloning. The chat controller 150 does not send the portions of the context 152 to the clone recipient(s) 310 that are marked as private. If the clone recipient(s) 310 do not accept the cloning, then the chat controller 150 does not send the context 152 to the clone recipient(s). Control then returns to block 405 where the chat controller 150 receives the same or a different command from the user I/O device 121 or the network 130, as previously described above.

If the determination at block 430 is false, then the received command is not a clone context command, so control continues to block 440 where the chat controller 150 determines whether the received command is a stop cloning command received from the user I/O device 121. If the determination at block 440 is true, then the received command is a stop cloning command, so control continues to block 445 where the chat controller 150 sets the cloned field 308 in the context 152 to indicate false, meaning that the context 152 is no longer being cloned. Control then returns to block 405 where the chat controller 150 receives the same or a different command from the user I/O device 121 or the network 130, as previously described above.

If the determination at block 440 is false, then the received command is not a stop cloning command, so control continues to block 450 where the chat controller 150 processes other commands, as further described below with reference to FIG. 5.

Figure 5:
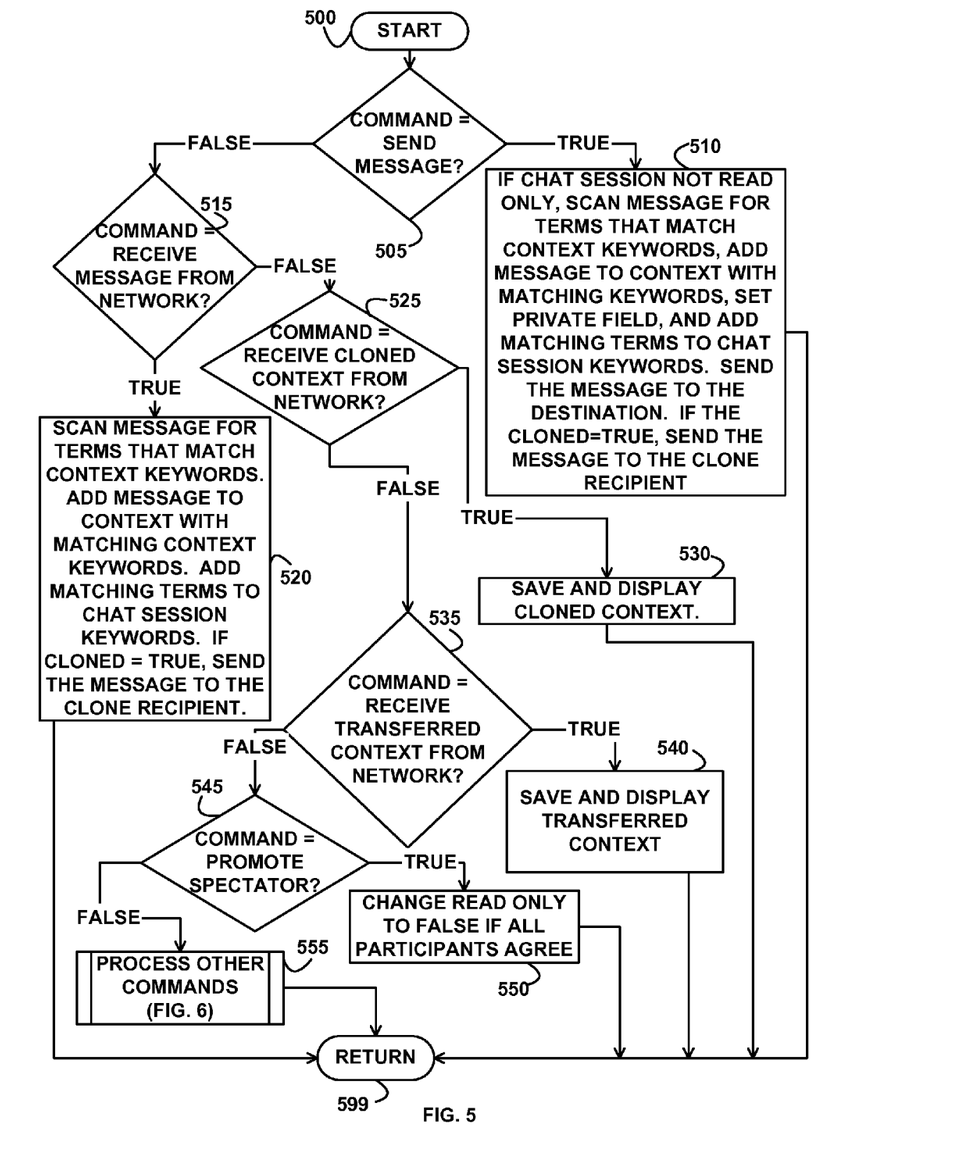
FIG. 5 depicts a flowchart for further processing of chat commands, according to an embodiment of the invention.

FIG. 5 depicts a flowchart for further processing of chat commands, according to an embodiment of the invention. Control begins at block 500. Control then continues to block 505 where the chat controller 150 determines whether the received command is a send chat instant message command received from the user I/O device 121. If the determination at block 505 is true, then the received command is a send chat instant message command that specifies an instant message and an identifier of a destination electronic device and/or user, so control continues to block 510 where the chat controller 150 scans the instant message for terms, compares the found terms in the instant message to the context keywords 339 in the various contexts 152 at the computer of the sender, and stores the instant message to the context 152 that comprises the context keywords 339 that match the terms found by the scan of the instant message if the chat session is not read only, as specified by the read only field 334 or the read only field 364. In an embodiment, the chat controller 150 does not add the instant message to chat sessions in a context 152 whose context keywords 339 do not match terms in the instant message or to chat sessions that are marked or indicated as read only via the read only field 334 or 364. In another embodiment, the chat controller 150 optionally stores instant messages before and/or after the instant messages with the matching terms, even if the instant message do not comprise matching terms, as previously described above)

The chat controller 150 adds the matching terms to the chat session keywords 332 or 362 of the respective chat session 320 or 322 to which the instant message is added. The chat controller chooses the respective chat session 320 or 322 to which to add the instant message that comprises participant identifiers 342 or 372 in pre-existing instant message records that match the sender and/or destination of the instant message or that comprises a chat session identifier (e.g., the "chat session A" or the "chat session B") that matches a chat session identifier specified by the received instant message. The chat controller 150 further sends the instant message to the destination electronic device and/or user specified by the destination identifier of the instant message via the network 130.

If the context 152 to which the chat controller 150 stored the instant message is cloned (as indicated by the cloned field 308), then the chat controller 150 sends the instant message to the clone recipient 310, who is specified by the context 152 to which the chat controller 150 stored the instant message, but who was not necessarily specified as the destination by the send chat instant message command. If the context 152 to which the chat controller 150 stored the instant message is not cloned (as indicated by the cloned field 308), then the chat controller 150 does not send the instant message to a clone recipient 310. If the send chat instant message command specifies that the instant message is private, then the chat controller 150 sets the private field 346 or 376 in the chat session to which the instant message is stored to indicate that the instant message is private. If the send chat instant message command specifies that the instant message is non-private, then the chat controller 150 sets the private field 346 or 376 in the chat session to which the instant message is stored to indicate that the instant message is not private. Control then continues to block 599 where the logic of FIG. 5 returns to the invoker.

If the determination at block 505 is false, then the received message is not a send chat instant message, so control continues to block 515 where the chat controller 150 determines whether the received command is a chat instant message received from the network 130, which specifies a destination at the computer at which the chat controller 150 executes. If the determination at block 515 is true, then the received command is a received chat instant message that specifies a destination at the computer at which the chat controller 150 executes, so control continues to block 520 where the chat controller 150 scans the received chat instant message for terms that match context keywords 339 in the various contexts 152. The chat controller 150 adds the chat instant message to the chat session 320 or the chat session 322 in the context 152 that comprises at least one context keyword 339 that match (are identical to) the scanned terms in the received instant message. In an embodiment, the chat controller 150 does not add the instant message to the chat session 320 or the chat session 322 in a context 152 that comprises context keywords 339 that do not match the scanned terms in the received instant message. In an embodiment, the controller 150 also optionally adds instant messages to the context 152 that are sent or received before and/or after the instant messages with the matching terms or optionally adds messages to the context 152 that are sent or received after but not before the instant messages with the matching terms.

The chat controller 150 adds the matching terms to the chat session keywords 332 or 362 of the respective chat session 320 or 322 to which the instant messages are added. The chat controller chooses the respective chat session 320 or 322 to which to add the instant message that comprises participant identifiers 342 or 372 in pre-existing instant message records that match the sender and/or destination of the received instant message or that comprises a chat session identifier (e.g., the "chat session A" or the "chat session B") that matches a chat session identifier specified by the received instant message. If the cloned field 308 of the context to which the chat controller 150 added the instant message indicates that the context 152 is cloned, then the chat controller 150 sends the instant message to the clone recipient(s) 310 specified by the context 152, even though the received instant message did not necessarily specify the clone recipient as a destination of the instant message. Control then continues to block 599 where the logic of FIG. 5 returns to the invoker.

If the determination at block 515 is false, then the received command is not a received chat instant message, so control continues to block 525 where the chat controller 150 determines whether the received command is a receive cloned context command received from the network 130. If the determination at block 525 is true, then the received command is a received cloned context command, so control continues to block 530 where the chat controller 150 saves the received cloned context (e.g., the cloned context 152-4 of FIG. 2) to memory and optionally displays or presents the received cloned context via the user I/O device 121. Control then continues to block 599 where the logic of FIG. 5 returns to the invoker.

If the determination at block 525 is false, then the received command is not a received cloned context command, so control continues to block 535 where the chat controller 150 determines whether the received command is a receive transferred context command received from the network 130. If the determination at block 535 is true, then the command is a receive transferred context command, so control continues to block 540 where the chat controller 150 receives, saves to memory, and optionally displays or presents the transferred context, e.g., the transferred context 152-5 of FIG. 2. Control then continues to block 599 where the logic of FIG. 5 returns to the invoker.

If the determination at block 535 is false, then received command is not a receive transferred context command, so control continues to block 545 where the chat controller 150 determines whether the received command is a promote spectator command received from the user I/O device 121. If the determination at block 545 is true, then the received command is a promote spectator command that specifies a context 152 and a user who is a spectator (meaning that the context is read only), so control continues to block 550 where the chat controller 150 changes the read only field in the specified context 152 and chat session to indicate that the chat session is not read only if all participants 342 or 372 specified in the chat session(s) of the specified context 152 agree with the promotion. If all participants in the chat session(s) of the specified context 152 and chat session do not agree with the promotion, then chat controller 150 does not change the read only field from read only to write allowed. Control then continues to block 599 where the logic of FIG. 5 returns to the invoker.

If the determination at block 545 is false, then the received command is not a promote spectator command, so control continues to block 555 where the chat controller 150 processes other commands, as further described below with reference to FIG. 6. Control then continues to block 599 where the logic of FIG. 5 returns to the invoker.

Figure 6:
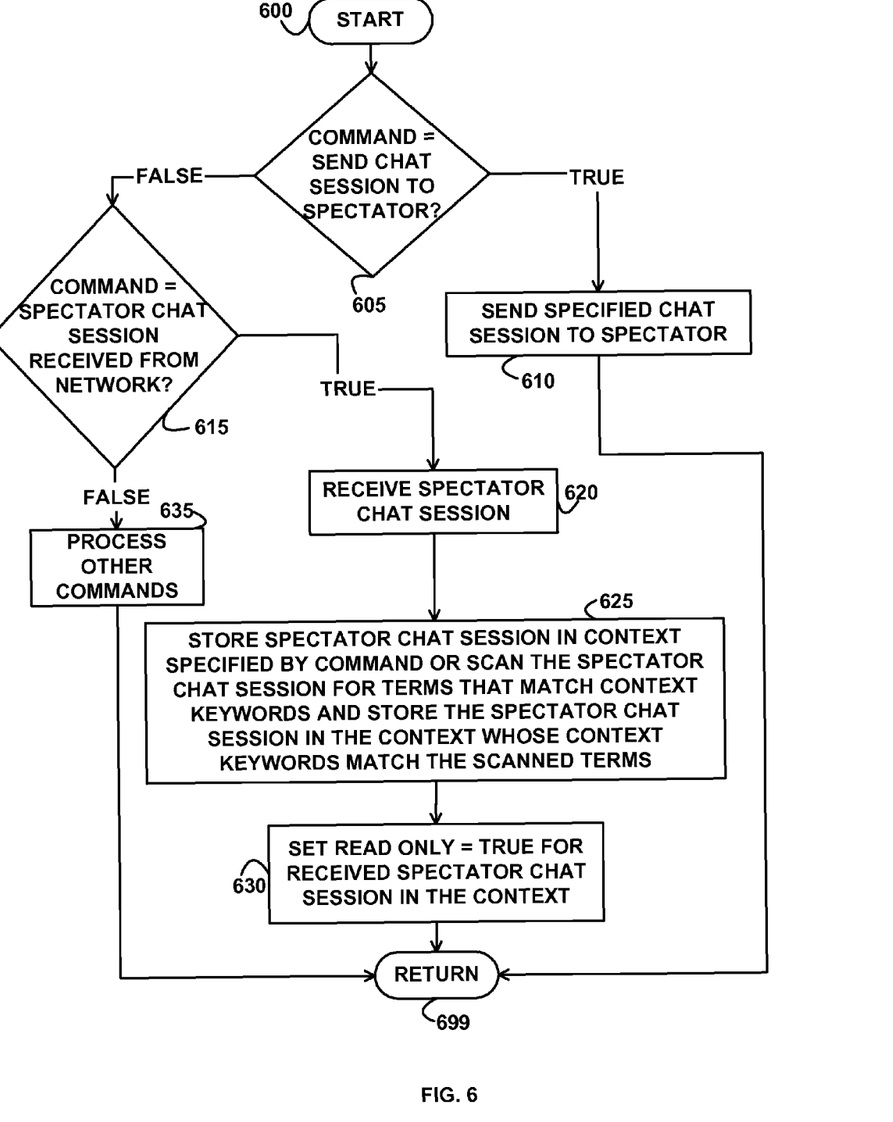
FIG. 6 depicts a flowchart for further processing of chat commands, according to an embodiment of the invention.

FIG. 6 depicts a flowchart for further processing of chat commands, according to an embodiment of the invention. Control begins at block 600. Control then continues to block 605 where the chat controller 150 determines whether the received command is a send chat session to a spectator command that is received via the user I/O device 121. If the determination at block 605 is true, then the received command is a send chat session to a spectator command that was received from the user I/O device 121, so control continues to block 610 where the chat controller 150 sends the chat session specified by the command to the spectator user and/or electronic device specified by the command via the network 130. Control then continues to block 699 where the logic of FIG. 6 returns to the invoker.

If the determination at block 605 is false, then the received command is not a send chat session to a spectator command, so control continues to block 615 where the chat controller 150 determines whether the received command specifies a spectator chat session received from the network 130. If the determination at block 615 is true, then the received command specifies a spectator chat session received from the network, so control continues to block 620 where the chat controller 150 receives the spectator chat session. Control then continues to block 625 where the chat controller 150 stores the received spectator chat session to the context 152 specified by command or scans the received spectator chat session for terms that match the context keywords 339 in the various contexts 152 at the electronic device of the chat controller 150 and stores the received spectator chat session to a chat session in the context 152 whose context keywords 339 match the scanned terms. Control then continues to block 630 where the chat controller 150 sets the read only field 334 or 364 in the received chat session to indicate that the chat session in the context is read only and may not be written to. Control then continues to block 699 where the logic of FIG. 6 returns to the invoker.

If the determination at block 615 is false, then the received command is not a spectator chat session, so control continues to block 635 where the chat controller 150 processes other commands. Control then continues to block 699 where the logic of FIG. 6 returns to the invoker. Thus, in an embodiment, the chat controller 150 aggregates instant messages into chat sessions based on keywords that match terms in the instant messages and sends the aggregated chat sessions to a recipient, which facilitates transfer of ownership or delegation of information.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention.

In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention. Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense.

What is claimed is:

1. A method comprising:
   deriving, from a plurality of names of a plurality of contexts, a plurality of respective context keywords, wherein the plurality of respective context keywords comprise terms that are not present in the plurality of names of the plurality of contexts;
   storing, to the plurality of contexts, the plurality of respective context keywords, wherein each of the plurality of respective context keywords is different;
   in response to sending a first plurality of instant messages within a first chat session from an electronic device, selecting at the electronic device a first context, from among the plurality of contexts, in which is stored a first context keyword of the plurality of respective context keywords that matches respective first terms in the first plurality of instant messages;
   storing the first plurality of instant messages of the first chat session to the first context;
   storing a status to the first context to indicate whether more instant messages are allowed to be added to the first context;
   storing the electronic device as owner to the first context to indicate the electronic device controls the first context and to indicate the electronic device is able to transfer ownership of the first context;
   in response to receiving a second plurality of instant messages within the first chat session at the electronic device, storing the second plurality of instant messages to the first context if the status of the first context indicates more instant messages are allowed to be added;
   in response to receiving a third plurality of instant messages within a second chat session at the electronic device, selecting at the electronic device the first context if the first context keyword matches a respective term in the third plurality of instant messages;
   if the status of the first context indicates more instant messages are allowed to be added to the first context, storing the third plurality of instant messages of the second chat session to the first context;
   sending the first context that comprises the first plurality of instant messages of the first chat session, the second plurality of instant messages of the first chat session, the third plurality of instant messages of the second chat session, the status, and the first context keyword to a recipient device;
   in response to the sending the first context to the recipient device, changing the status in the first context at the electronic device to indicate that no more instant messages are allowed to be added to the first context at the electronic device, wherein more instant messages are allowed to be added to the first context at the recipient device, and
   storing the recipient device as owner to the first context to indicate the recipient electronic device controls the first context and to indicate the recipient electronic device is able to transfer ownership of the first context.

2. The method of claim 1, wherein the sending the first context that comprises the first plurality of instant messages to the recipient device further comprises:
   sending the first plurality of instant messages that are indicated as non-private to the recipient device.

3. The method of claim 1, wherein the recipient device of the first context is different from a plurality of respective destinations of the sending of the first plurality of instant messages and is different from a plurality of respective originators of the second plurality of instant messages and third plurality of instant messages.

4. The method of claim 3, further comprising:
   marking the first chat session as read only in the first context, wherein the recipient device is not allowed to write to the first chat session; and
   allowing the recipient device to write to the first chat session in the first context if the plurality of respective destinations of the sending of the first plurality of instant messages agree.

5. The method of claim 1, further comprising:
   in response to adding a first instant message to the first chat session in the first context, sending the first instant message to a clone recipient if the first context indicates that the first context is cloned to the clone recipient; and
   refraining from sending the first instant message to the clone recipient if the first context indicates that the first context is not cloned.

6. A non-transitory computer-readable storage medium encoded with instructions, wherein the instructions when executed comprise:
   deriving, from a plurality of names of a plurality of contexts, a plurality of respective context keywords, wherein the plurality of respective context keywords comprise terms that are not present in the plurality of names of the plurality of contexts;
   storing, to the plurality of contexts, the plurality of respective context keywords, wherein each of the plurality of respective context keywords is different;
   in response to sending a first plurality of instant messages within a first chat session from an electronic device, selecting at the electronic device a first context, from among the plurality of contexts, in which is stored a first context keyword of the plurality of respective context keywords that matches respective first terms in the first plurality of instant messages;
   storing the first plurality of instant messages of the first chat session to the first context;
   storing a status to the first context to indicate whether more instant messages are allowed to be added to the first context;

storing the electronic device as owner to the first context to indicate the electronic device controls the first context and to indicate the electronic device is able to transfer ownership of the first context;

in response to receiving a second plurality of instant messages within the first chat session at the electronic device, storing the second plurality of instant messages to the first context if the status of the first context indicates more instant messages are allowed to be added;

in response to receiving a third plurality of instant messages within a second chat session at the electronic device, selecting at the electronic device the first context, from among the plurality of contexts, in which is stored the first keyword of the plurality of respective context keywords that matches the respective first terms in the third plurality of instant messages;

if the status of the first context indicates more instant messages are allowed to be added to the first context, storing the third plurality of instant messages to the first context;

sending the first context that comprises the first plurality of instant messages of the first chat session, the second plurality of messages of the first chat session, the third plurality of instant messages of the second chat session, the status, and the first context keyword to a recipient device;

in response to the sending the first context to the recipient device, changing the status in the first context at the electronic device to indicate that no more instant messages are allowed to be added to the first context at the electronic device, wherein more instant messages are allowed to be added to the first context at recipient device, and;

storing the recipient device as owner to the first context to indicate the recipient device controls the first context and to indicate the recipient device is able to transfer ownership of the first context.

7. The non-transitory computer-readable storage medium of claim 6, wherein the sending the first context that comprises the first plurality of instant messages to the recipient device further comprises:

sending the first plurality of instant messages that are indicated as non-private to the recipient device.

8. The computer-readable storage medium of claim 6, wherein the recipient device of the first context is different from a plurality of respective destinations of the sending of the first plurality of instant messages and is different from a plurality of respective senders of the second plurality of instant messages and third plurality of instant messages.

9. The non-transitory computer-readable storage medium of claim 8, further comprising:

marking the first chat session as read only in the first context, wherein the recipient device is not allowed to write to the first chat session; and.

allowing the recipient device to write to the first chat session in the first context if the plurality of respective destinations of the sending of the first plurality of instant messages agree.

10. The non-transitory computer-readable storage medium of claim 6, further comprising:

in response to adding a first instant message to the first chat session in the first context, sending the first instant message to a clone recipient if the first context indicates that the first context is cloned to the clone recipient; and refraining from sending the first instant message to the clone recipient if the first context indicates that the first context is not cloned.

11. A computer, comprising:

a processor; and memory communicatively coupled to the processor, wherein the memory is encoded with instructions, wherein the instructions when executed on the processor comprise:

deriving, from a plurality of names of a plurality of contexts, a plurality of respective context keywords, wherein the plurality of respective context keywords comprise terms that are not present in the plurality of names of the plurality of contexts, storing, to the plurality of contexts, the plurality of respective context keywords, wherein each of the plurality of respective context keywords is different, in response to sending a first plurality of instant messages within a first chat session from an electronic device, selecting at the electronic device a first context, from among the plurality of contexts, in which is stored a first context keyword of the plurality of respective context keywords that matches respective first terms in the first plurality of instant messages, storing the first plurality of instant messages of the first chat session to the first context, storing a status to the first context to indicate whether more instant messages are allowed to be added to the first context, storing the electronic device as owner to the first context to indicate the electronic device controls the first context and to indicate the electronic device is able to transfer ownership of the first context, in response to receiving a second plurality of instant messages within the first chat session at the electronic device, storing the second plurality of instant messages to the first context if the status of the first context indicates more instant messages are allowed to be added;

in response to receiving of a third plurality of instant messages within a second chat session at the electronic device, selecting at the electronic device the first context, from among the plurality of contexts, in which is stored the first keyword of the plurality of respective context keywords that matches the respective first terms in the third plurality of instant messages, if the status of the first context indicates more instant messages are allowed to be added to the first context, storing the third plurality of instant messages to the first context, and sending the first context that comprises the first plurality of instant messages of the first chat session, the second plurality of messages of the first chat session, the third plurality of messages of the second chat session, the status, and the first context keyword to a recipient device, in response to the sending the first context to the recipient device, changing the status in the first context at the electronic device to indicate that no more instant messages are allowed to be added to the first context at the electronic device, wherein more instant messages are allowed to be added to the first context at the recipient device, and storing the recipient device as owner to the first context to indicate the recipient device controls the first context and to indicate the recipient device is able to transfer ownership of the first context.

12. The computer of claim 11, wherein the sending the first context to the recipient device further comprises:
sending the first plurality of instant messages that are indicated as non-private to the recipient device.

13. The computer of claim 11, wherein the instructions further comprise:
marking the first chat session as read only in the first context, wherein the recipient device is not allowed to write to the first chat session; and
allowing the recipient device to write to the first chat session in the first context if the plurality of respective destinations of the sending of the first plurality of instant messages agree.

14. The computer of claim 11, wherein the instructions further comprising:
in response to adding a first instant message to the first chat session in the first context, sending the first instant message to a clone recipient if the first context indicates that the first context is cloned to the clone recipient; and
refraining from sending the first instant message to the clone recipient if the first context indicates that the first context is not cloned.

15. The computer of claim 11, wherein the recipient device of the first context is different from a plurality of respective destinations of the sending of the first plurality of instant messages and is different from a plurality of respective senders of the second plurality of instant messages and third plurality of instant messages.

\* \* \* \* \*